United States Patent
Kang et al.

(10) Patent No.: US 11,212,088 B2
(45) Date of Patent: Dec. 28, 2021

(54) PRIVATE KEY GENERATION METHOD AND SYSTEM, AND DEVICE

(71) Applicant: Huawei Technologies Co., Ltd., Shenzhen (CN)

(72) Inventors: Xin Kang, Singapore (SG); Xuwu Zhang, Shenzhen (CN); Yanjiang Yang, Singapore (SG); Haiguang Wang, Singapore (SG); Zhongding Lei, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 16/564,140

(22) Filed: Sep. 9, 2019

(65) Prior Publication Data

US 2020/0007324 A1 Jan. 2, 2020

Related U.S. Application Data

(63) Continuation of application No. PCT/CN2018/073405, filed on Jan. 19, 2018.

(30) Foreign Application Priority Data

Mar. 8, 2017 (CN) .......................... 201710137943.2

(51) Int. Cl.
*H04L 9/08* (2006.01)
(52) U.S. Cl.
CPC ............ *H04L 9/0866* (2013.01); *H04L 9/085* (2013.01); *H04L 9/0891* (2013.01)
(58) Field of Classification Search
CPC ...... H04L 9/0866; H04L 9/085; H04L 9/0891
(Continued)

(56) References Cited

U.S. PATENT DOCUMENTS

| 5,535,276 A | 7/1996 | Ganesan |
| 5,588,061 A | 12/1996 | Ganesan et al. |

(Continued)

FOREIGN PATENT DOCUMENTS

| CN | 1655498 A | 8/2005 |
| CN | 102164367 A | 8/2011 |

(Continued)

OTHER PUBLICATIONS

Chen et al., "Over the Air Provisioning of Industrial Wireless Devices Using Elliptic Curve Cryptography", 2011 IEEE, pp. 594-600 (Year: 2011).*

(Continued)

*Primary Examiner* — Khalil Naghdali
(74) *Attorney, Agent, or Firm* — Leydig, Voit & Mayer, Ltd.

(57) ABSTRACT

Embodiments of this application provide a private key generation method and system, and a device. The method includes: receiving, by a terminal device, a first response message sent by a first network device, where the first response message includes at least a first sub-private key, and the first sub-private key is generated based on a first parameter set sent by a second network device; receiving, by the terminal device, a second response message sent by the second network device, where the second response message includes at least a second sub-private key, and the second sub-private key is generated based on a second parameter set sent by the first network device; and synthesizing, by the terminal device, a joint private key based on at least the first sub-private key and the second sub-private key.

14 Claims, 5 Drawing Sheets

(58) Field of Classification Search
USPC .......................................................... 713/171
See application file for complete search history.

(56) References Cited

U.S. PATENT DOCUMENTS

| | | | |
|---|---|---|---|
| 6,792,530 | B1 | 9/2004 | Qu et al. |
| 8,233,627 | B2 | 7/2012 | Tanaka et al. |
| 9,282,085 | B2 | 3/2016 | Oberheide et al. |
| 2007/0162958 | A1* | 7/2007 | Kao ...................... H04W 12/50 726/4 |
| 2009/0154711 | A1 | 6/2009 | Jho et al. |
| 2013/0322621 | A1* | 12/2013 | Yoon ..................... H04L 9/3066 380/44 |
| 2016/0156470 | A1 | 6/2016 | Rietman et al. |
| 2017/0006469 | A1* | 1/2017 | Palanigounder ...... H04L 9/0891 |

FOREIGN PATENT DOCUMENTS

| | | |
|---|---|---|
| CN | 103051628 A | 4/2013 |
| CN | 103974250 A | 8/2014 |
| CN | 104243456 A | 12/2014 |
| CN | 105379173 A | 3/2016 |
| CN | 106465111 A | 2/2017 |
| CN | 106471834 A | 3/2017 |
| KR | 20130056199 A | 5/2013 |
| WO | 2011033259 A2 | 3/2011 |
| WO | 2016025080 A1 | 2/2016 |

OTHER PUBLICATIONS

Jaiswal et al., "Pairwise Key Generation Scheme for Cellular Mobile Communication", 2012 31st International Symposium on Reliable Distributed Systems, pp. 412-417 (Year: 2012).*

Claeys et al., "Securing Complex IoT Platforms with Token Based Access Control and Authenticated Key Establishment", 2017 IEEE International Workshop on Secure Internet of Things, pp. 1-9 (Year: 2017).*

Groves, "Elliptic Curve-Based Certificateless Signatures for Identity-Based Encryption (ECCSI)," Internet Engineering Task Force (IETF), Request for Comments: 6507, Category: Informational, ISSN: 2070-1721, (Feb. 2012).

Tan, "An efficient identity-based tripartite authenticated key agreement protocol," Electronic Commerce Research, vol. 12, XP035132371, DOI 10.1007/s10660-012-9103-y, pp. 505-518, Springer Science+Business Media, New York (Oct. 30, 2012).

"3rd Generation Partnership Project; Technical Specification Group Services and System Aspects; Feasibility Study on New Services and Markets Technology Enablers for Massive Internet of Things; Stage 1 (Release 14)," 3GPP TR 22.861 V14.1.0, pp. 1-28, 3rd Generation Partnership Project, Valbonne, France (Sep. 2016).

Joux, "A One Round Protocol for Tripartite Diffie-Hellman," International Algorithmic Number Theory Symposium, Lecture Notes in Computer Science (ANTS-IV, LNCS), vol. 1838, ISBN: 978-3-540-67695-9, XP019049043, pp. 385-393, Springer-Verlag, Berlin, Heidelberg (2000).

"3rd Generation Partnership Project; Technical Specification Group Services and System Aspects; 3GPP System Architecture Evolution (SAE); Security architecture (Release 14)," 3GPP TS 33.401 V14.1.0, pp. 1-152, 3rd Generation Partnership Project, Valbonne, France (Dec. 2016).

Lim et al., "An Enhanced One-round Pairing-based Tripartite Authenticated Key Agreement Protocol," XP061002293, pp. 1-12 (2007).

"3rd Generation Partnership Project; Technical Specification Group Services and System Aspects; Study on the security aspects of the next generation system (Release 14)," 3GPP TR 33.899 V0.7.0, pp. 1-471, 3rd Generation Partnership Project, Valbonne, France (Feb. 2017).

Huawei, HiSilicon, Deutsche Telekom AG, "Security for V2X Broadcast Communication: Introducing Temporary ID management Function for V2X Data Source Accountability," 3GPP TSG SA WG3 (Security) Meeting #84, Chennai (India), S3-161031, total 10 pages (Jul. 25-29, 2016).

CN/201710137943.2, Office Action/Search Report, dated Apr. 22, 2021.

* cited by examiner

PRIVATE KEY GENERATION METHOD AND SYSTEM, AND DEVICE

CROSS-REFERENCE TO RELATED APPLICATIONS

This application is a continuation of International Application No. PCT/CN2018/073405, filed on Jan. 19, 2018, which claims priority to Chinese Patent Application No. 201710137943.2, filed on Mar. 8, 2017. The disclosures of the aforementioned applications are hereby incorporated by reference in their entireties.

TECHNICAL FIELD

This application relates to the communications field, and in particular, to a private key generation method and system, and a device.

BACKGROUND

Currently, increasingly shrunk voice and SMS message services create increasingly fewer benefits for telecom operators. Therefore, the telecom operators focus on a vertical industry market, and the telecom operators increasingly cooperate with vertical industry customers. A bilateral relationship between a telecom operator and a terminal device is replaced by a trilateral relationship among a telecom operator, a vertical industry customer, and a terminal device. An original symmetric key authentication system cannot meet a requirement of the new trilateral relationship. This is because in the original symmetric key authentication system, both a telecom operator and a terminal device need to prestore a same authentication key, and perform authentication by using the authentication key. In this way, a symmetric key is controlled by the telecom operator, which poses a threat to security of digital assets of the vertical industry customer. In the new trilateral relationship, the telecom operator does not want the authentication key to be controlled by the vertical industry customer, and the vertical industry customer also does not want the authentication key to be controlled by the telecom operator. However, the authentication key needs to be trusted by both the telecom operator and the vertical industry.

SUMMARY

This application provides a private key generation method and system, and a device, so that a key that is trusted by both a telecom operator and a vertical industry customer but is not controlled by either the telecom operator or the vertical industry customer can be generated.

According to a first aspect, a private key generation method is provided, where the method is applied to a terminal device side, and includes: receiving, by a terminal device, a first response message sent by a first network device, where the first response message includes at least a first sub-private key, and the first sub-private key is generated based on a first parameter set sent by a second network device; receiving, by the terminal device, a second response message sent by the second network device, where the second response message includes at least a second sub-private key, and the second sub-private key is generated based on a second parameter set sent by the first network device; and synthesizing, by the terminal device, a joint private key based on at least the first sub-private key and the second sub-private key.

According to a second aspect, a private key generation method is provided, where the method is applied to a first network device side, and includes: receiving, by a first network device, a first request sent by a terminal device, where the first request includes an identifier of the terminal device and an identifier of a second network device; receiving, by the first network device based on the identifier of the second network device, a second global public key and a second public validation token that are sent by the second network device, where the second global public key is generated by the second network device, and the second public validation token is generated by the second network device; generating, by the first network device, a first sub-private key based on a first parameter set, where the first parameter set includes the identifier of the terminal device, the second global public key, and the second public validation token; and sending, by the first network device, a first response message to the terminal device, where the first response message includes at least the first sub-private key.

According to a third aspect, a private key generation method is provided, where the method is applied to a second network device side, and includes: receiving, by a second network device, an identifier of the terminal device, a first global public key, and a first public validation token, where the first global public key is generated by the first network device, and the first public validation token is generated by the first network device; generating, by the second network device, a second sub-private key based on a second parameter set, where the second parameter set includes the identifier of the terminal device, the second global public key, and the second public validation token; and sending, by the second network device, a second response message to the terminal device, where the second response message includes at least the second sub-private key.

The private key generation method is described separately from perspectives of the terminal device, the first network device side, and the second network device side in the first aspect, the second aspect, and the third aspect. By implementing the method, the first network device generates the first sub-private key, the second network device generates the second sub-private key, and the terminal device synthesizes a first joint private key based on the first sub-private key and the second sub-private key. Because the first joint private key is generated based on the first sub-private key, the first joint private key can be trusted by the first network device (a vertical industry customer). In addition, because the first joint private key is generated also based on the second sub-private key, the first joint private key can also be trusted by the second network device (a telecom operator). However, the first network device knows only the first sub-private key but does not know the second sub-private key, and the second network device knows only the second sub-private key but does not know the first sub-private key. Therefore, the first joint private key is not controlled by either the telecom operator or the vertical industry customer.

With reference to the first aspect or the second aspect or the third aspect, in some possible implementations, the terminal device synthesizes the first sub-private key and the second sub-private key into a first joint private key according to the following formula:

SSK_1=SSK1+SSK2, where

SSK_1 is the first joint private key, SSK1 is the first sub-private key, and SSK2 is the second sub-private key.

It may be understood that the terminal device further needs to generate a first joint public key corresponding to the first joint private key, and the first joint public key is paired with the first joint private key. In other words, when using the first joint private key to perform signature, the terminal device may use the first joint public key to perform verification. The first joint public key includes a first joint public validation token and an identifier of the terminal device. Therefore, before the first joint public key is generated, the first joint public validation token needs to be first determined. Herein, the terminal device obtains the first joint public validation token in the following several manners:

In a first manner, the terminal device calculates the first joint public validation token according to the following formula:

$$PVT\_U1=PVT1*PVT2, \text{ where}$$

PVT_U1 is the first joint public validation token; PVT1 is the first public validation token, where the first public validation token is generated by the first network device; and PVT2 is the second public validation token, where the second public validation token is generated by the second network device.

In a second manner, the first network device calculates the first joint public validation token according to the following formula:

$$PVT\_U1=PVT1*PVT2, \text{ where}$$

PVT_U1 is the first joint public validation token; PVT1 is the first public validation token, where the first public validation token is generated by the first network device; and PVT2 is the second public validation token, where the second public validation token is generated by the second network device. The first network device generates the first joint public validation token, and sends the first joint public validation token to the terminal device by using the first response message. Correspondingly, the terminal device obtains the first joint public validation token from the first response message.

In a third manner, the second network device calculates the first joint public validation token according to the following formula:

$$PVT\_U1=PVT1*PVT2, \text{ where}$$

PVT_U1 is the first joint public validation token; PVT1 is the first public validation token, where the first public validation token is generated by the first network device; and PVT2 is the second public validation token, where the second public validation token is generated by the second network device. The second network device generates the first joint public validation token, and sends the first joint public validation token to the terminal device by using the second response message. Correspondingly, the terminal device obtains the first joint public validation token from the second response message.

With reference to the first aspect or the second aspect or the third aspect, in some possible implementations, the terminal device synthesizes the first sub-private key and the second sub-private key into a second joint private key according to the following formula:

$$SSK\_2=SSK1+SSK2+HS*v0 \bmod q, \text{ where}$$

SSK_2 is the second joint private key; SSK1 is the first sub-private key; SSK2 is the second sub-private key; HS is a hash parameter, where HS=hash(KPAK1||KPAK2||ID||PVT_U2), hash( ) is a hash function, KPAK1 is a first global public key, where the first global public key is generated by the first network device, KPAK2 is a second global public key, where the second global public key is generated by the second network device, ID is the identifier of the terminal device, and PVT_U2 is a second joint public validation token; q is a prime number; and v0 is a random number selected by the terminal device from a finite field F_q generated by the prime number q.

In this implementation, the first network device knows only the first sub-private key but does not know the second sub-private key and a terminal device-specific parameter, and the second network device knows only the second sub-private key but does not know the first sub-private key and the terminal device-specific parameter. Therefore, the joint private key is not controlled by either a telecom operator or a vertical industry customer. In addition, because the first network device and the second network device cannot obtain the terminal device-specific parameter even if cooperating with each other, the first network device and the second network device cannot decrypt the second joint private key even if cooperating with each other. Therefore, security of the second joint private key can be further improved.

It may be understood that the terminal device further needs to generate a second joint public key corresponding to the second joint private key, and the second joint public key is paired with the second joint private key. In other words, when using the second joint private key to perform signature, the terminal device may use the second joint public key to perform verification. The second joint public key includes a second joint public validation token and an identifier of the terminal device. Therefore, before the second joint public key is generated, the second joint public validation token needs to be first determined. Herein, the terminal device obtains the second joint public validation token in the following several manners:

In a first manner, the terminal device calculates the second joint public validation token according to the following formula:

$$PVT\_U2=PVT1*PVT2*PVT3, \text{ where}$$

PVT_U2 is the second joint public validation token; PVT1 is the first public validation token, where the first public validation token is generated by the first network device; PVT2 is the second public validation token, where the second public validation token is generated by the second network device; and PVT3 is a third public validation token, where the third public validation token is generated by the terminal device.

In a second manner, the first network device calculates the second joint public validation token according to the following formula:

$$PVT\_U2=PVT1*PVT2*PVT3, \text{ where}$$

PVT_U2 is the second joint public validation token; PVT1 is the first public validation token, where the first public validation token is generated by the first network device; PVT2 is the second public validation token, where the second public validation token is generated by the second network device; and PVT3 is a third public valida- tion token, where the third public validation token is generated by the terminal device. The first network device generates the second joint public validation token, and sends the second joint public validation token to the terminal device by using the first response message. Correspondingly, the terminal device obtains the second joint public validation token from the first response message.

In a third manner, the second network device calculates the second joint public validation token according to the following formula:

$$PVT\_U2=PVT1*PVT2*PVT3, \text{ where}$$

PVT_U2 is the second joint public validation token; PVT1 is the first public validation token, where the first public validation token is generated by the first network device; PVT2 is the second public validation token, where the second public validation token is generated by the second network device; and PVT3 is a third public validation token, where the third public validation token is generated by the terminal device. The second network device generates the second joint public validation token, and sends the second joint public validation token to the terminal device by using the second response message. Correspondingly, the terminal device obtains the second joint public validation token from the second response message.

According to a fourth aspect, a terminal device is provided, and includes a unit configured to perform the method according to the first aspect.

According to a fifth aspect, a network device is provided, and includes a unit configured to perform the method according to the second aspect.

According to a sixth aspect, a network device is provided, and includes a unit configured to perform the method according to the third aspect.

According to a seventh aspect, a terminal device is provided, and includes a memory, a processor coupled to the memory, and a communications module, where the communications module is configured to send or receive externally sent data, the memory is configured to store implementation code for the method described in the first aspect, and the processor is configured to execute program code stored in the memory, in other words, perform the method described in the first aspect.

According to an eighth aspect, a network device is provided, and includes a memory, a processor coupled to the memory, and a communications module, where the communications module is configured to send or receive externally sent data, the memory is configured to store implementation code for the method described in the second aspect, and the processor is configured to execute program code stored in the memory, in other words, perform the method described in the second aspect.

According to a ninth aspect, a network device is provided, and includes a memory, a processor coupled to the memory, and a communications module, where the communications module is configured to send or receive externally sent data, the memory is configured to store implementation code for the method described in the third aspect, and the processor is configured to execute program code stored in the memory, in other words, perform the method described in the third aspect.

According to a tenth aspect, a computer readable storage medium is provided, where the computer readable storage medium stores an instruction, and when the instruction is run on a computer, the computer performs the method according to the first aspect.

According to an eleventh aspect, a computer readable storage medium is provided, where the computer readable storage medium stores an instruction, and when the instruction is run on a computer, the computer performs the method according to the second aspect.

According to a twelfth aspect, a computer readable storage medium is provided, where the computer readable storage medium stores an instruction, and when the instruction is run on a computer, the computer performs the method according to the third aspect.

According to a thirteenth aspect, a computer program product including an instruction is provided, where when the computer program product is run on a computer, the computer performs the method according to the first aspect.

According to a fourteenth aspect, a computer program product including an instruction is provided, where when the computer program product is run on a computer, the computer performs the method according to the second aspect.

According to a fifteenth aspect, a computer program product including an instruction is provided, where when the computer program product is run on a computer, the computer performs the method according to the third aspect.

According to a sixteenth aspect, a private key generation system is provided, and includes a first network device, a second network device, and a terminal device, where the terminal device may be the terminal device in the content of the fourth aspect, the first network device may be the network device in the content of the fifth aspect, and the second network device may be the network device in the content of the sixth aspect; or the terminal device may be the network device in the content of the seventh aspect, the first network device may be the network device in the content of the eighth aspect, and the second network device may be the network device in the content of the ninth aspect.

DESCRIPTION OF DRAWINGS

To describe the technical solutions in the embodiments of this application more clearly, the following briefly describes the accompanying drawings required for describing the embodiments or the prior art.

DESCRIPTION OF EMBODIMENTS

Figure 1:
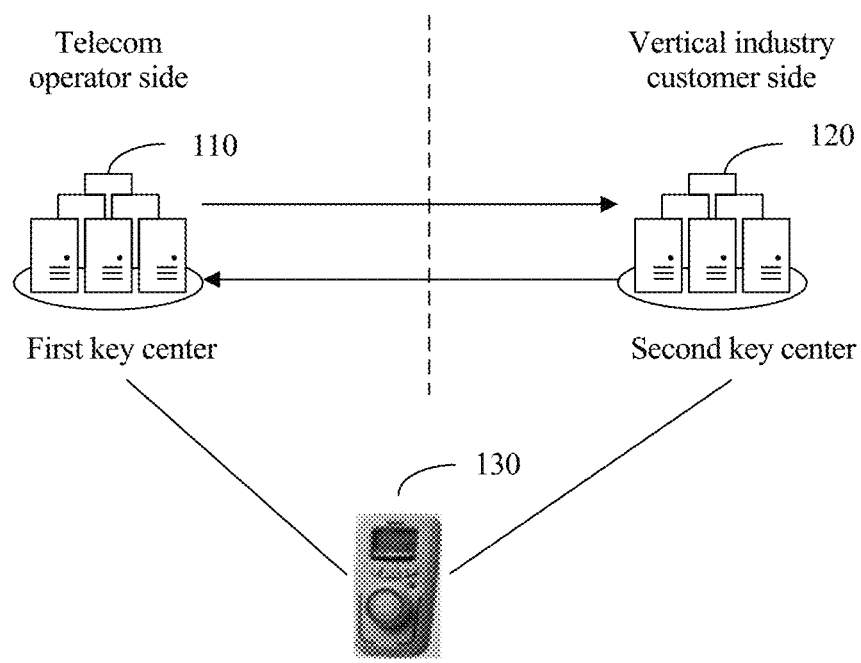
FIG. 1 is a schematic diagram of a communications system according to an embodiment of this application.

The following clearly describes technical solutions of embodiments in this application with reference to accompanying drawings.

For ease of understanding, a communications system to which the embodiments of this application are applied is first described. The communications system in the embodiments includes a first network device 110, a second network device 120, and a terminal device 130 that can communicate with each other. The first network device 110 is disposed on a vertical industry customer side, and the first network device 110 serves a vertical industry customer. The second network device 120 is disposed on a telecom operator side, and the second network device 120 serves a telecom operator.

In the embodiments of this application, the first network device 110 is responsible for generating and distributing a private key of the terminal device 130, and is separately deployed as an independent logical function entity. The first network device 110 may be a private key generation center (KGC) or the like. It may be understood that the private key generation center may have different actual product names in different systems. For example, in some systems, the private key generation center is referred to as a private key generator (PKG). Certainly, a change of the product name does not affect essence of the private key generation center.

In the embodiments of this application, the second network device 120 is responsible for generating and distributing a private key of the terminal device, and is separately deployed as an independent logical function entity. The second network device 120 may be a private key generation center (KGC) or the like. It may be understood that the private key generation center may have different actual product names in different systems. For example, in some systems, the private key generation center is referred to as a private key generator (PKG). Certainly, a change of the product name does not affect essence of the private key generation center.

In the embodiments of this application, the first network device 110 and the second network device 120 generate a private key of the terminal device by using an identity-based cryptography (IBC) mechanism. In a specific implementation, the first network device 110 and the second network device 120 generate the private key of the terminal device according to the IETF standard RFC 6507. In the identity-based cryptography mechanism, a public key is a character string having a special meaning, for example, an email address or a telephone number.

In the embodiments of this application, the terminal device is a logical entity, and may be specifically any one of a user equipment, an Internet of things (IoT) device, and the like. The user equipment may be a smartphone, a smartwatch, a smart tablet, or the like. The Internet of things device may be a sensor, an electricity meter, a water meter, or the like. In a specific embodiment, the terminal device is an Internet of things device that is disposed at a special geographical location and that cannot be directly powered by a power grid but can be powered only by a battery disposed inside the Internet of things device. For example, the terminal device may be a low-power camera media device such as a smart doorbell, may be a meter device such as a smart water meter or a smart electricity meter that is disposed in a dark corner of a high building, may be a biological health device such as a heart pacemaker that is embedded in a human body, or may be a weather monitoring device disposed in a barren countryside.

To resolve the foregoing problems, the embodiments of this application provide a private key generation method and system, and a device, so that a key that is trusted by both a telecom operator and a vertical industry customer but is not controlled by either the telecom operator or the vertical industry customer can be generated. The following separately provides detailed descriptions.

Figure 2:
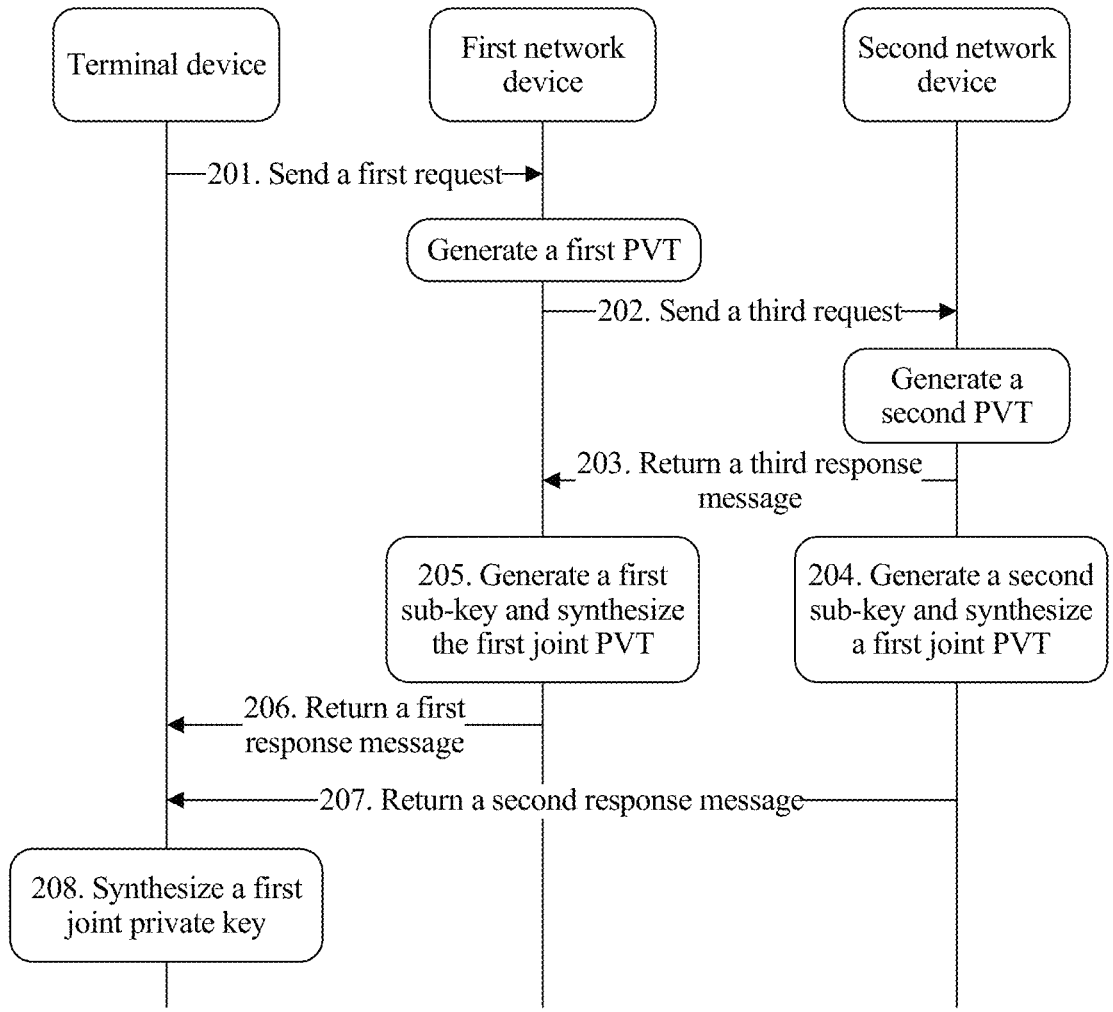
FIG. 2 is an interaction diagram of a private key generation method according to an embodiment of this application.

FIG. 2 is an interaction diagram of a private key generation method according to an embodiment of this application. As shown in FIG. 2, the method includes the following steps.

201. The terminal device sends a first request to the first network device, where the first request includes a first indication, an identifier of the terminal device, and an identifier of the second network device.

In this embodiment of this application, the first indication is used to request to jointly generate a joint private key. For example, the first indication may be a data bit. When the data bit is set to 1, it indicates that jointly generating a joint private key is requested. The foregoing example is merely used as an example, and cannot be used as a specific limitation.

In this embodiment of this application, the identifier of the terminal device may be a media access control (MAC) address, an Internet protocol (IP) address, a mobile number, an international mobile equipment identity (IMEI), an international mobile subscriber identity (IMSI), an IP multimedia private identity (IMPI), a temporary mobile subscriber identity (TMSI), an IP multimedia public identity (IMPU), a globally unique temporary UE identity (GUTI), or the like.

In this embodiment of this application, the identifier of the second network device may be a media access control (MAC) address, an Internet protocol (IP) address, a uniform resource locator (URL) address, a public email address, a postal address, a registered entity name, or the like.

202. The first network device sends a third request to the second network device, where the third request includes the identifier of the terminal device, a first global public key, and a first public validation token.

In this embodiment of this application, the first global public key is a public key held by the first network device. The first global public key is generated by the first network device based on a global private key and a global parameter of the first network device. For example, in the RFC 6507, $KPAK1=[KSAK1]G$, where KPAK1 is the first global public key; KSAK1 is a first global key, where the first global key is a key held by the first network device; and G is the global parameter.

In this embodiment of this application, the first public validation token is a public validation token (PVT) generated by the first network device for the terminal device. For details of a definition of a public validation token, refer to the IETF standard RFC 6507. In a specific embodiment, the first network device may obtain the first public validation token through calculation according to the following formula:

$PVT1=[v1]G$, where

PVT1 is the first public validation token, v1 is a random number selected by the first network device from a finite field F_q generated by a prime number q, and G is a point on an elliptic curve.

203. The second network device returns a third response message to the first network device, where the third response message includes a second global public key and a second public validation token.

In this embodiment of this application, the second global public key is a public key held by the second network device. The second global public key is generated by the second network device based on a global private key and a global parameter of the second network device. For example, in the FRC 6507, $KPAK2=[KSAK2]G$, where KPAK2 is the second global public key; KSAK2 is a second global key, where the second global key is a key held by the second network device; and G is the global parameter.

In this embodiment of this application, the second public validation token is a public validation token generated by the second network device for the terminal device. In a specific embodiment, the second network device may obtain the second public validation token through calculation according to the following formula:

$PVT2=[v2]G$, where

PVT2 is the second public validation token, v2 is a random number selected by the second network device from a finite field F_q generated by a prime number q, and G is a point on an elliptic curve.

204. The second network device generates the second sub-private key based on the identifier of the terminal device, the first global public key, and the first public validation token.

In this embodiment of this application, the second network device generates the second sub-private key according to the following formula:

$$SSK2=KSAK2+HS*v2 \bmod q, \text{ where}$$

SSK2 is the second sub-private key; KSAK2 is a second global key, where the second global key is a key held by the second network device; HS is a hash parameter; q is a prime number; and v2 is a random number selected by the second network device from a finite field F_q generated by the prime number q.

In a specific embodiment, the second network device may calculate the hash parameter according to the following formula:

$$HS=hash(KPAK1\|KPAK2\|ID\|PVT\_U1), \text{ where}$$

HS is the hash parameter, hash( ) is a hash function, KPAK1 is the first global public key, KPAK2 is the second global public key, ID is the identifier of the terminal device, and PVT_U1 is a first joint validation token. The first joint public validation token may be generated by the second network device according to the following formula:

$$PVT\_U1=PVT1*PVT2, \text{ where}$$

PVT_U1 is the first joint public validation token, PVT1 is the first public validation token generated by the first network device, and PVT2 is the second public validation token generated by the second network device. It may be understood that the foregoing example is merely used as an example, and should not constitute a specific limitation.

In this embodiment of this application, the second network device may synthesize a first joint public key based on the first joint public validation token and the device identifier, and store the first joint public key in the second network device. The first joint public key is paired with a first joint private key generated in the last step 209. For example, when the terminal device uses the first joint private key to perform signature, the second network device may use the first joint public key to perform authentication on the signature.

205. The first network device generates the first sub-private key based on the identifier of the terminal device, the second global public key, and the second public validation token.

In this embodiment of this application, the first network device generates the first sub-private key according to the following formula:

$$SSK1=KSAK1+HS*v1 \bmod q, \text{ where}$$

SSK1 is the first sub-private key; KSAK1 is a first global key, where the first global key is a key held by the first network device; HS is a hash parameter; q is a prime number; and v1 is a random number selected by the first network device from a finite field F_q generated by the prime number q.

In a specific embodiment, the first network device may calculate the hash parameter according to the following formula:

$$HS=hash(KPAK1\|KPAK2\|ID\|PVT\_U1), \text{ where}$$

HS is the hash parameter, hash( ) is a hash function, KPAK1 is the first global public key, KPAK2 is the second global public key, ID is the identifier of the terminal device, and PVT_U1 is the first joint validation token.

In this embodiment of this application, the first joint public validation token may be generated by the first network device according to the following formula:

$$PVT\_U1=PVT1*PVT2, \text{ where}$$

PVT_U1 is the first joint public validation token, PVT1 is the first public validation token generated by the first network device, and PVT2 is the second public validation token generated by the second network device. It may be understood that the foregoing example is merely used as an example, and should not constitute a specific limitation.

In this embodiment of this application, the first joint public key in the first network device may be synthesized by the first network device based on the first joint public validation token and the device identifier, or may be sent by the second network device to the first network device by adding the first joint public key to the third response message. This is not specifically limited in this application. When the terminal device uses the first joint private key to perform signature, the first network device may use the first joint public key to perform authentication on the signature.

206. The first network device sends a first response message to the terminal device, where the first response message includes at least the first sub-private key.

207. The second network device sends a second response message to the terminal device, where the second response message includes at least the second sub-private key.

208. The terminal device synthesizes the first joint private key based on at least the first sub-private key and the second sub-private key.

In this embodiment of this application, the terminal device may be a final user of the first joint private key, for example, the terminal device uses the first joint private key to perform signature. Alternatively, the terminal device may be only a tool for synthesizing the first joint private key, to be specific, after synthesizing the first joint private key, the terminal device does not use the first joint private key to perform signature, but writes the first joint private key into a target device, so that the target device uses the first joint private key to perform signature. For example, the terminal device is a dedicated private key synthesizer. The private key synthesizer is configured to synthesize the first joint private key and write the first joint private key into the target device in a wired or wireless manner. In another embodiment, the first joint private key may be further used to perform encryption and the like. This is not specifically limited in the present disclosure.

In this embodiment of this application, the wired manner includes but is not limited to RS232, RS485, a printer port, a network cable, and the like. The wireless manner includes a long-range wireless manner and a short-range wireless manner. The long-range wireless manner includes a general packet radio service, a global system for mobile communications, second-generation to fifth-generation mobile communications technologies, even a subsequent evolved mobile communications technology, and the like. The short-range wireless manner includes but is not limited to Bluetooth, ZigBee, a wireless local area network, an ultra-wideband technology, a radio frequency identification technology, near field communication, and the like.

In a specific embodiment, the terminal device synthesizes the first sub-private key and the second sub-private key into the first joint private key according to the following formula:

$$SSK\_1=SSK1+SSK2, \text{ where}$$

SSK_1 is the first joint private key, SSK1 is the first sub-private key, and SSK2 is the second sub-private key. It may be understood that the terminal device may alternatively synthesize the first sub-private key and the second sub-private key into the first joint private key according to a subtraction formula:

$$SSK\_1 = SSK1 - SSK2$$

However, in this case, the first joint public validation token is generated according to the following formula:

$$PVT\_U1 = PVT1/PVT2.$$

In this embodiment of this application, the first joint public key in the terminal device is synthesized by the terminal device based on the first joint public validation token and the device identifier, or is sent by the first network device to the terminal device by adding the first joint public key to the first response message, or is sent by the second network device to the terminal device by adding the first joint public key to the second response message. This is not specifically limited in this application.

In a specific embodiment, if the first joint public key in the terminal device is synthesized by the terminal device based on the first joint public validation token and the device identifier, the terminal device needs to determine the first joint public validation token before synthesizing the first joint public key.

In specific application, the first network device may add the first public validation token to the first response message, to send the first response message to the terminal device. After receiving the first response message, the terminal device obtains the first public validation token from the first response message. The second network device may add the second public validation token to the second response message, to send the second response message to the terminal device. After receiving the second response message, the terminal device obtains the second public validation token from the second response message. Finally, the terminal device calculates the first joint public validation token according to the following formula:

$$PVT\_U1 = PVT1 * PVT2, \text{ where}$$

PVT_U1 is the first joint public validation token, PVT1 is the first public validation token, and PVT2 is the second public validation token.

In specific application, to reduce a calculation amount of the terminal device, the first network device may add the first joint public validation token in the first network device to the first response message, to send the first response message to the terminal device. After receiving the first response message, the terminal device obtains the first joint public validation token from the first response message.

In specific application, to reduce a calculation amount of the terminal device, the second network device may add the first joint public validation token in the second network device to the second response message, to send the second response message to the terminal device. After receiving the second response message, the terminal device obtains the first joint public validation token from the second response message.

In this embodiment, the first network device generates the first sub-private key, the second network device generates the second sub-private key, and the terminal device synthesizes the first joint private key based on the first sub-private key and the second sub-private key. Because the first joint private key is generated based on the first sub-private key, the first joint private key can be trusted by the first network device (a vertical industry customer). In addition, because the first joint private key is generated also based on the second sub-private key, the first joint private key can also be trusted by the second network device (a telecom operator). However, the first network device knows only the first sub-private key but does not know the second sub-private key, and the second network device knows only the second sub-private key but does not know the first sub-private key. Therefore, the first joint private key is not controlled by either the telecom operator or the vertical industry customer.

Figure 3:
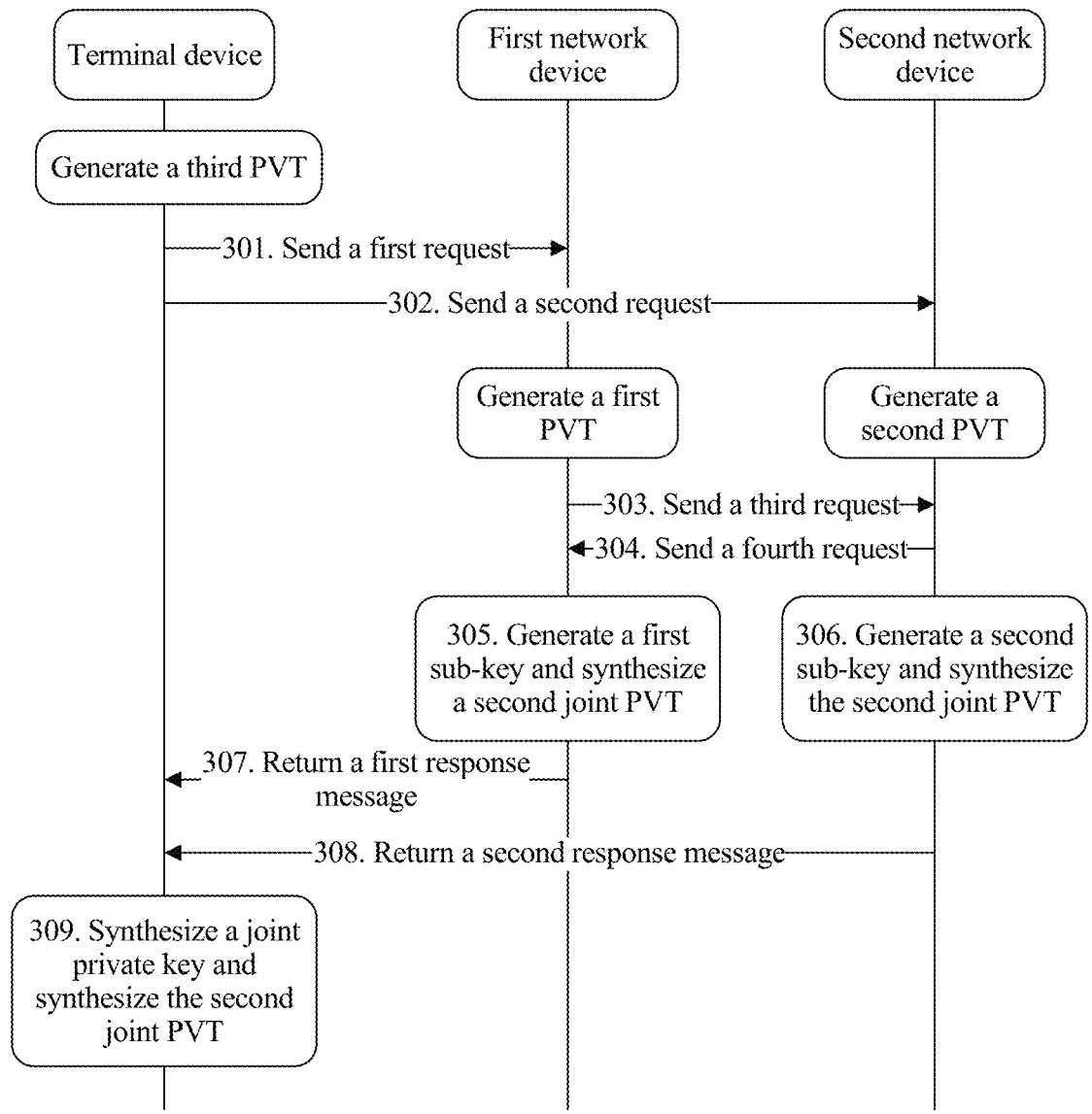
FIG. 3 is an interaction diagram of another private key generation method according to an embodiment of this application.

FIG. 3 is an interaction diagram of another private key generation method according to an embodiment of this application. As shown in FIG. 3, the method includes the following steps.

301. The terminal device sends a first request to the first network device, where the first request includes a first indication, an identifier of the terminal device, an identifier of the second network device, and a third public validation token.

In this embodiment of this application, the first indication is used to request to jointly generate a joint private key. For example, the first indication may be a data bit. When the data bit is set to 1, it indicates that jointly generating a joint private key is requested. The foregoing example is merely used as an example, and cannot be used as a specific limitation.

In this embodiment of this application, the identifier of the terminal device may be a media access control address, an Internet protocol address, a mobile number, an international mobile equipment identity, an international mobile subscriber identity, an IP multimedia private identity, a temporary mobile subscriber identity, an IP multimedia public identity, a globally unique temporary UE identity, or the like.

In this embodiment of this application, the identifier of the second network device may be a media access control address, an Internet protocol address, a URL address, a public email address, a postal address, a registered entity name, or the like.

In this embodiment of this application, the third public validation token is a public validation token generated by the terminal device. In a specific embodiment, the terminal device may obtain the third public validation token through calculation according to the following formula:

$$PVT3 = [v3]G, \text{ where}$$

PVT3 is the third public validation token, v3 is a random number selected by the terminal device from a finite field F_q generated by a prime number q, and G is a point on an elliptic curve.

302. The terminal device sends a second request to the second network device, where the second request includes the first indication, the identifier of the terminal device, an identifier of the first network device, and the third public validation token.

In this embodiment of this application, the identifier of the first network device may be a media access control (MAC) address, an Internet protocol (IP) address, a URL address, a public email address, a postal address, a registered entity name, or the like.

303. The first network device sends a third request to the second network device based on the identifier of the second network device, where the third request includes the identifier of the terminal device, a first global public key, and a first public validation token.

In this embodiment of this application, the first global public key is a public key held by the first network device. The first global public key is generated by the first network device based on a global private key and a global parameter of the first network device. For example, in the FRC 6507, $$KPAK1 = [KSAK1]G, \text{ where}$$

KPAK1 is the first global public key; KSAK1 is a first global key, where the first global key is a key held by the first network device; and G is the global parameter.

In this embodiment of this application, the first public validation token is a public validation token (PVT) generated by the first network device for the terminal device. For details of a definition of a public validation token, refer to the IETF standard RFC 6507. In a specific embodiment, the first network device may obtain the first public validation token through calculation according to the following formula:

$$PVT1=[v1]G, \text{ where}$$

PVT1 is the first public validation token, v1 is a random number selected by the first network device from a finite field F_q generated by a prime number q, and G is a point on an elliptic curve.

304. The second network device sends a fourth request to the first network device based on the identifier of the first network device, where the fourth request includes the identifier of the terminal device, a second global public key, and a second public validation token.

In this embodiment of this application, the second global public key is a public key held by the second network device. The second global public key is generated by the second network device based on a global private key and a global parameter of the second network device. For example, in the FRC 6507, $$KPAK2=[KSAK2]G, \text{ where}$$

KPAK2 is the second global public key; KSAK2 is a second global key, where the second global key is a key held by the second network device; and G is the global parameter.

In this embodiment of this application, the second public validation token is a public validation token generated by the second network device for the terminal device. In a specific embodiment, the second network device may obtain the second public validation token through calculation according to the following formula:

$$PVT2=[v2]G, \text{ where}$$

PVT2 is the second public validation token, v2 is a random number selected by the second network device from a finite field F_q generated by a prime number q, and G is a point on an elliptic curve.

305. The first network device generates a first sub-private key based on the first parameter set, where the first parameter set includes the identifier of the terminal device, the second global public key, the second public validation token, and the third public validation token.

In this embodiment of this application, the first network device generates the first sub-private key according to the following formula:

$$SSK1=KSAK1+HS*v1 \bmod q, \text{ where}$$

SSK1 is the first sub-private key; KSAK1 is a first global key, where the first global key is a key held by the first network device; HS is a hash parameter; q is a prime number; and v1 is a random number selected by the first network device from a finite field F_q generated by the prime number q.

In a specific embodiment, the first network device may calculate the hash parameter according to the following formula:

$$HS=\text{hash}(KPAK1\|KPAK2\|ID\|PVT\_U2), \text{ where}$$

HS is the hash parameter, hash( ) is a hash function, KPAK1 is the first global public key, KPAK2 is the second global public key, ID is the identifier of the terminal device, and PVT_U2 is a second joint validation token.

In this embodiment of this application, the second joint public validation token may be generated by the first network device according to the following formula, and is stored in the first network device:

$$PVT\_U2=PVT1*PVT2*PVT3, \text{ where}$$

PVT_U2 is the second joint public validation token, PVT1 is the first public validation token generated by the first network device, PVT2 is the second public validation token generated by the second network device, and PVT3 is the third public validation token generated by the terminal device. It may be understood that the foregoing example is merely used as an example, and should not constitute a specific limitation.

In this embodiment of this application, the first network device may synthesize a second joint public key based on the second joint public validation token and the device identifier, and store the second joint public key in the first network device. The second joint public key is paired with a second joint private key generated in the last step 309. For example, when the terminal device uses the second joint private key to perform signature, the first network device may use the second joint public key to perform authentication on the signature.

306. The second network device generates a second sub-private key based on the second parameter set, where the second parameter set includes the identifier of the terminal device, the first global public key, the first public validation token, and the third public validation token.

In this embodiment of this application, the second network device generates the second sub-private key according to the following formula:

$$SSK2=KSAK2+HS*v2 \bmod q, \text{ where}$$

SSK2 is the second sub-private key; KSAK2 is a second global key, where the second global key is a key held by the second network device; HS is a hash parameter; q is a prime number; and v2 is a random number selected by the second network device from a finite field F_q generated by the prime number q.

In a specific embodiment, the second network device may calculate the hash parameter according to the following formula:

$$HS=\text{hash}(KPAK1\|KPAK2\|ID\|PVT\_U2), \text{ where}$$

HS is the hash parameter, hash( ) is a hash function, KPAK1 is the first global public key, KPAK2 is the second global public key, ID is the identifier of the terminal device, and PVT_U2 is the second joint validation token. The second joint public validation token may be generated by the second network device according to the following formula, and is stored in the second network device:

$$PVT\_U2=PVT1*PVT2*PVT3, \text{ where}$$

PVT_U2 is the second joint public validation token, PVT1 is the first public validation token generated by the first network device, PVT2 is the second public validation token generated by the second network device, and PVT3 is the third public validation token generated by the terminal device. It may be understood that the second network device may not calculate the hash parameter and the second joint public validation token, but obtains the hash parameter and the second joint public validation token from a first private key, and stores the hash parameter and the second joint public validation token in the second network device.

In this embodiment of this application, the second joint public key in the second network device may be synthesized by the second network device based on the second joint public validation token and the device identifier, or may be sent by the first network device to the second network device. This is not specifically limited in this application. When the first network device sends the second joint public key to the second network device, the third request sent by the first network device to the second network device further includes the second joint public key. When the terminal device uses the second joint private key to perform signature, the first network device may use the second joint public key to perform authentication on the signature.

307. The first network device sends a first response message to the terminal device, where the first response message includes at least the first sub-private key.

308. The second network device sends a second response message to the terminal device, where the second response message includes at least the second sub-private key.

309. The terminal device synthesizes a second joint private key based on the first sub-private key and the second sub-private key.

In this embodiment of this application, the terminal device may be a final user of the second joint private key, for example, the terminal device uses the second joint private key to perform signature. Alternatively, the terminal device may be only a tool for synthesizing the second joint private key, to be specific, after synthesizing the second joint private key, the terminal device does not use the second joint private key to perform signature, but writes the second joint private key into a target device, so that the target device uses the second joint private key to perform signature. For example, the terminal device is a dedicated private key synthesizer. The private key synthesizer is configured to synthesize the second joint private key and write the second joint private key into the target device in a wired or wireless manner. In another embodiment, the second joint private key may be further used to perform encryption and the like. This is not specifically limited in the present disclosure.

In this embodiment of this application, the wired manner includes but is not limited to RS232, RS485, a printer port, a network cable, and the like. The wireless manner includes a long-range wireless manner and a short-range wireless manner. The long-range wireless manner includes a general packet radio service (GPRS), a global system for mobile communications (GSM), second-generation to fifth-generation (2G-5G) mobile communications technologies, even a subsequent evolved mobile communications technology, and the like. The short-range wireless manner includes but is not limited to Bluetooth, ZigBee, a wireless local area network (WLAN), an ultra-wideband (UWB) technology, a radio frequency identification (RFID) technology, near field communication (NFC), and the like.

In a specific embodiment, the terminal device synthesizes the first sub-private key and the second sub-private key into the second joint private key according to the following formula:

SSK_2=SSK1+SSK2+HS*v0 mod q, where

SSK_2 is the second joint private key, SSK1 is the first sub-private key, SSK2 is the second sub-private key, HS is a hash parameter, where HS=hash (KPAK1||KPAK2||ID||PVT_U2), hash( ) is a hash function, KPAK1 is the first global public key, KPAK2 is the second global public key, ID is the identifier of the terminal device, PVT_U2 is the second joint public validation token, q is a prime number, and v0 is a random number selected by the terminal device from a finite field F_q generated by the prime number q.

In this embodiment of this application, the second joint public key in the terminal device is synthesized by the terminal device based on the second joint public validation token and the device identifier, or is sent by the first network device to the terminal device by adding the second joint public key to the first response message, or is sent by the second network device to the terminal device by adding the second joint public key to the second response message. This is not specifically limited in this application.

In a specific embodiment, if the second joint public key in the terminal device is synthesized by the terminal device based on the second joint public validation token and the device identifier, the terminal device needs to determine the second joint public validation token before synthesizing the second joint public key.

In specific application, the first network device may add the second joint public validation token in the first network device to the first response message, to send the first response message to the terminal device. After receiving the first response message, the terminal device obtains the second joint public validation token from the first response message.

In specific application, the second network device may add the second joint public validation token in the second network device to the second response message, to send the second response message to the terminal device. After receiving the second response message, the terminal device obtains the second joint public validation token from the second response message.

In specific application, the first network device may add the first public validation token to the first response message, to send the first response message to the terminal device. After receiving the first response message, the terminal device obtains the first public validation token from the first response message. The second network device may add the second public validation token to the second response message, to send the second response message to the terminal device. After receiving the second response message, the terminal device obtains the second public validation token from the second response message. Finally, the terminal device calculates the second joint public validation token according to the following formula:

PVT_U2=PVT1*PVT2*PVT3, where

PVT_U2 is the second joint public validation token, PVT1 is the first public validation token, PVT2 is the second public validation token, and PVT3 is the third public validation token.

In this embodiment, the first network device generates the first sub-private key, the second network device generates the second sub-private key, and the terminal device synthesizes the second joint private key based on the first sub-private key, the second sub-private key, and a terminal device-specific parameter (v0). Because the second joint private key is generated based on the first sub-private key, the second joint private key can be trusted by the first network device (a vertical industry customer). In addition, because the second joint private key is generated also based on the second sub-private key, the second joint private key can also be trusted by the second network device (a telecom operator). However, the first network device knows only the first sub-private key but does not know the second sub-private key and the terminal device-specific parameter, and the second network device knows only the second sub-private key but does not know the first sub-private key and the terminal device-specific parameter. Therefore, the joint private key is not controlled by either the telecom operator or the vertical industry customer. In addition, because the first network device and the second network device cannot obtain the terminal device-specific parameter even if cooperating with each other, the first network device and the second network device cannot decrypt the second joint private key even if cooperating with each other. Therefore, security of the second joint private key can be further improved.

Figure 4:
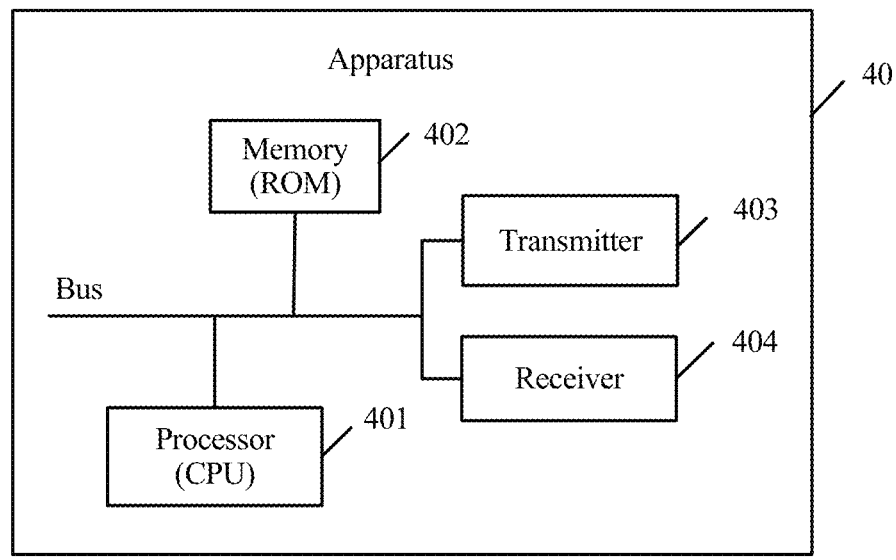
FIG. 4 is a schematic structural diagram of an apparatus according to an embodiment of this application.

Based on a same inventive concept, an embodiment of the present disclosure further provides an apparatus (shown in FIG. 4). The apparatus is configured to implement the method described in the embodiment in FIG. 4. As shown in FIG. 4, an apparatus 40 includes a transmitter 403, a receiver 404, a memory 402, and a processor 401 coupled to the memory 402 (there may be one or more processors 401, and an example in which there is one processor is used in FIG. 4). The transmitter 403, the receiver 404, the memory 402, and the processor 401 may be connected by using a bus or in another manner (an example in which the transmitter 403, the receiver 404, the memory 402, and the processor 401 are connected by using the bus is used in FIG. 4). The transmitter 403 is configured to send data to the outside, and the receiver 404 is configured to receive data from the outside. The memory 402 is configured to store program code, and the processor 401 is configured to invoke and run the program code stored in the memory 402.

When the apparatus 40 is a terminal device, the program code stored in the memory 402 is specifically used to implement functions of the terminal device in the embodiments in FIG. 2 and FIG. 3. Specifically, the processor 401 is configured to invoke the program code stored in the memory 402, so that the following steps are performed:

The receiver 404 receives a first response message sent by a first network device. The first response message includes at least a first sub-private key, and the first sub-private key is generated based on a first parameter set sent by a second network device.

The receiver 404 receives a second response message sent by the second network device. The second response message includes at least a second sub-private key, and the second sub-private key is generated based on a second parameter set sent by the first network device.

The processor 401 synthesizes a joint private key based on at least the first sub-private key and the second sub-private key.

In this embodiment of this application, the processor 401 synthesizes the joint private key based on at least the first sub-private key and the second sub-private key in at least the following manners:

In a first possible implementation, the processor 401 synthesizes the first sub-private key and the second sub-private key into a first joint private key according to the following formula:

SSK_1=SSK1+SSK2, where

SSK_1 is the first joint private key, SSK1 is the first sub-private key, and SSK2 is the second sub-private key.

It may be understood that the terminal device further needs to generate a first joint public key corresponding to the first joint private key, and the first joint public key is paired with the first joint private key. In other words, when using the first joint private key to perform signature, the terminal device may use the first joint public key to perform verification. The first joint public key includes a first joint public validation token and an identifier of the terminal device. Therefore, before the first joint public key is generated, the first joint public validation token needs to be first determined. Herein, the terminal device obtains the first joint public validation token in the following several manners:

In a first manner, the processor 401 calculates the first joint public validation token according to the following formula:

PVT_U1=PVT1*PVT2, where

PVT_U1 is the first joint public validation token; PVT1 is the first public validation token, where the first public validation token is generated by the first network device; and PVT2 is the second public validation token, where the second public validation token is generated by the second network device.

In a second manner, the first network device calculates the first joint public validation token according to the following formula:

PVT_U1=PVT1*PVT2, where

PVT_U1 is the first joint public validation token; PVT1 is the first public validation token, where the first public validation token is generated by the first network device; and PVT2 is the second public validation token, where the second public validation token is generated by the second network device. The first network device generates the first joint public validation token, and sends the first joint public validation token to the terminal device by using the first response message. Correspondingly, the terminal device receives the first response message by using the receiver 404, and then the processor 401 obtains the first joint public validation token from the first response message.

In a third manner, the second network device calculates the first joint public validation token according to the following formula:

PVT_U1=PVT1*PVT2, where

PVT_U1 is the first joint public validation token; PVT1 is the first public validation token, where the first public validation token is generated by the first network device; and PVT2 is the second public validation token, where the second public validation token is generated by the second network device. The second network device generates the first joint public validation token, and sends the first joint public validation token to the terminal device by using the second response message. Correspondingly, the terminal device receives the second response message by using the receiver 404, and then the processor 401 obtains the first joint public validation token from the second response message.

It may be understood that the terminal device further needs to generate a second joint public key corresponding to a second joint private key, and the second joint public key is paired with the second joint private key. In other words, when using the second joint private key to perform signature, the terminal device may use the second joint public key to perform verification. The second joint public key includes a second joint public validation token and an identifier of the terminal device. Therefore, before the second joint public key is generated, the second joint public validation token needs to be first determined. Herein, the terminal device obtains the second joint public validation token in the following several manners:

In a first manner, the processor 401 calculates the second joint public validation token according to the following formula:

$$PVT\_U2 = PVT1 * PVT2 * PVT3, \text{ where}$$

PVT_U2 is the second joint public validation token; PVT1 is the first public validation token, where the first public validation token is generated by the first network device; PVT2 is the second public validation token, where the second public validation token is generated by the second network device; and PVT3 is a third public validation token, where the third public validation token is generated by the terminal device.

In a second manner, the first network device calculates the second joint public validation token according to the following formula:

$$PVT\_U2 = PVT1 * PVT2 * PVT3, \text{ where}$$

PVT_U2 is the second joint public validation token; PVT1 is the first public validation token, where the first public validation token is generated by the first network device; PVT2 is the second public validation token, where the second public validation token is generated by the second network device; and PVT3 is a third public validation token, where the third public validation token is generated by the terminal device. The first network device generates the second joint public validation token, and sends the second joint public validation token to the terminal device by using the first response message. Correspondingly, the terminal device receives the first response message by using the receiver 404, and then the processor 401 obtains the second joint public validation token from the first response message.

In a third manner, the second network device calculates the second joint public validation token according to the following formula:

$$PVT\_U2 = PVT1 * PVT2 * PVT3, \text{ where}$$

PVT_U2 is the second joint public validation token; PVT1 is the first public validation token, where the first public validation token is generated by the first network device; PVT2 is the second public validation token, where the second public validation token is generated by the second network device; and PVT3 is a third public validation token, where the third public validation token is generated by the terminal device. The second network device generates the second joint public validation token, and sends the second joint public validation token to the terminal device by using the second response message. Correspondingly, the terminal device receives the second response message by using the receiver 404, and then the processor 401 obtains the second joint public validation token from the second response message.

Optionally, the transmitter 403 sends a first request to the first network device, and the first request includes at least an identifier of the terminal device and an identifier of the second network device.

Optionally, the transmitter 403 sends a first request to the first network device, and the first request includes an identifier of the terminal device and an identifier of the second network device. The transmitter 403 sends a second request to the second network device, and the second request includes the identifier of the terminal device and an identifier of the first network device.

When the apparatus 40 is a network device, the program code stored in the memory 402 is specifically used to implement functions of the first network device in the embodiments in FIG. 2 and FIG. 3. Specifically, the processor 301 is configured to invoke the program code stored in the memory 302, so that the following steps are performed:

The receiver 404 receives a first request sent by a terminal device. The first request includes an identifier of the terminal device and an identifier of a second network device.

The receiver 404 receives, based on the identifier of the second network device, a second global public key and a second public validation token that are sent by the second network device. The second global public key is generated by the second network device, and the second public validation token is generated by the second network device.

The processor 401 generates a first sub-private key based on a first parameter set. The first parameter set includes the identifier of the terminal device, the second global public key, and the second public validation token.

The transmitter 403 sends a first response message to the terminal device. The first response message includes at least the first sub-private key.

Optionally, the processor 401 calculates the first joint public validation token according to the following formula:

$$PVT\_U1 = PVT1 * PVT2, \text{ where}$$

PVT_U1 is the first joint public validation token, where the first joint public validation token and the identifier of the terminal device are synthesized into a first joint public key, and the first joint public key is paired with the first joint private key; PVT1 is the first public validation token; and PVT2 is the second public validation token.

Optionally, the processor 401 calculates a second joint public validation token according to the following formula:

$$PVT\_U2 = PVT1 * PVT2 * PVT3, \text{ where}$$

PVT_U2 is the first joint public validation token, where the second joint public validation token and the identifier of the terminal device are synthesized into a second joint public key, and the second joint public key is paired with the second joint private key; PVT1 is the first public validation token; PVT2 is the second public validation token; and PVT3 is the third public validation token.

When the apparatus 40 is a network device, the program code stored in the memory 402 is specifically used to implement functions of the second network device in the embodiments in FIG. 2 and FIG. 3. Specifically, the processor 301 is configured to invoke the program code stored in the memory 302, so that the following steps are performed:

The receiver 404 receives an identifier of the terminal device, a first global public key, and a first public validation token. The first global public key is generated by the first network device, and the first public validation token is generated by the first network device.

The processor 401 generates a second sub-private key based on a second parameter set. The second parameter set includes the identifier of the terminal device, the second global public key, and the second public validation token.

The transmitter 403 sends a second response message to the terminal device. The second response message includes at least the second sub-private key.

Optionally, the processor 401 calculates a first joint public validation token according to the following formula:

$$PVT\_U1 = PVT1 * PVT2, \text{ where}$$

PVT_U1 is the first joint public validation token, where the first joint public validation token and the identifier of the terminal device are synthesized into a first joint public key, and the first joint public key is paired with the first joint private key; PVT1 is the first public validation token; and PVT2 is the second public validation token.

Optionally, the processor 401 calculates a second joint public validation token according to the following formula:

PVT_U2=PVT1*PVT2*PVT3, where

PVT_U2 is the second joint public validation token, where the second joint public validation token and the identifier of the terminal device are synthesized into a second joint public key, and the second joint public key is paired with the second joint private key; PVT1 is the first public validation token; PVT2 is the second public validation token; and PVT3 is the third public validation token.

Based on a same inventive concept, an embodiment of the present disclosure further provides a terminal device (shown in FIG. 5), a first network device (shown in FIG. 6), and a second network device (shown in FIG. 7), to perform the private key generation method described in the embodiments in FIG. 2 and FIG. 3.

Figure 5:
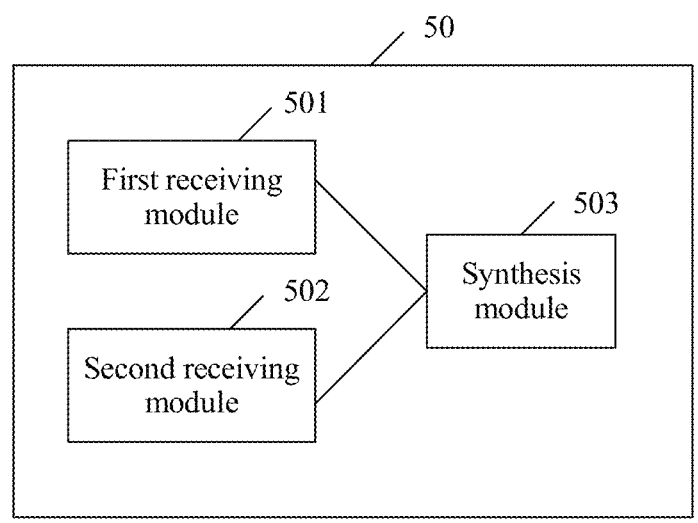
FIG. 5 is a schematic structural diagram of a terminal device according to an embodiment of this application.

As shown in FIG. 5, a terminal device 50 may include a first receiving module 501, a second receiving module 502, and a synthesis module 503.

The first receiving module 501 is configured to receive a first response message sent by a first network device. The first response message includes at least a first sub-private key, and the first sub-private key is generated based on a first parameter set sent by a second network device.

The second receiving module 502 is configured to receive a second response message sent by the second network device. The second response message includes at least a second sub-private key, and the second sub-private key is generated based on a second parameter set sent by the first network device.

The synthesis module 503 is configured to synthesize a joint private key based on at least the first sub-private key and the second sub-private key.

It should be noted that according to detailed descriptions of the embodiments in FIG. 2 and FIG. 3, a person skilled in the art may clearly know an implementation method of each function module included in the terminal device 50. Therefore, for brevity of the specification, details are not described herein again.

Figure 6:
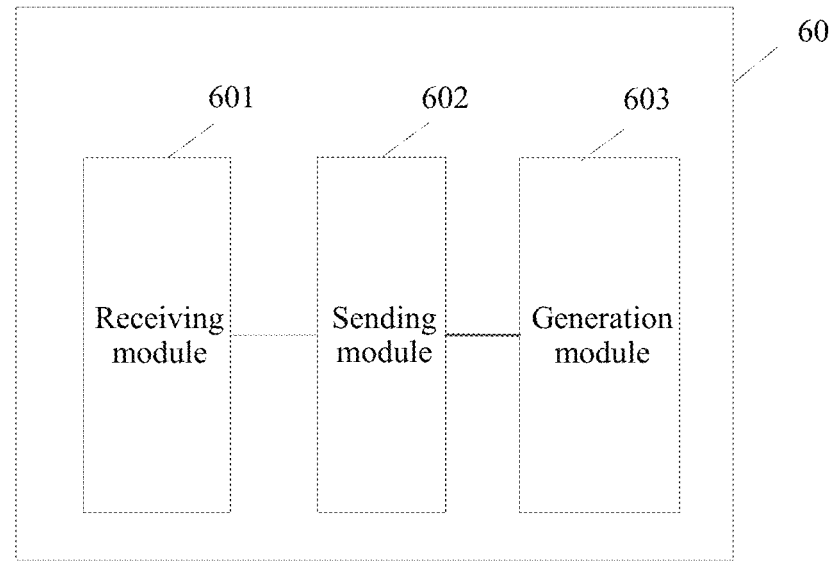
FIG. 6 is a schematic structural diagram of a network device according to an embodiment of this application.

As shown in FIG. 6, a first network device 60 may include a receiving module 601, a sending module 602, and a generation module 603.

The receiving module 601 is configured to receive a first request sent by a terminal device. The first request includes an identifier of the terminal device and an identifier of a second network device.

The sending module 602 is configured to receive, based on the identifier of the second network device, a second global public key and a second public validation token that are sent by the second network device. The second global public key is generated by the second network device, and the second public validation token is generated by the second network device.

The generation module 603 is configured to generate a first sub-private key based on a first parameter set. The first parameter set includes the identifier of the terminal device, the second global public key, and the second public validation token.

The sending module 602 is configured to send a first response message to the terminal device. The first response message includes at least the first sub-private key.

It should be noted that according to detailed descriptions of the embodiments in FIG. 2 and FIG. 3, a person skilled in the art may clearly know an implementation method of each function module included in the first network device 60. Therefore, for brevity of the specification, details are not described herein again.

Figure 7:
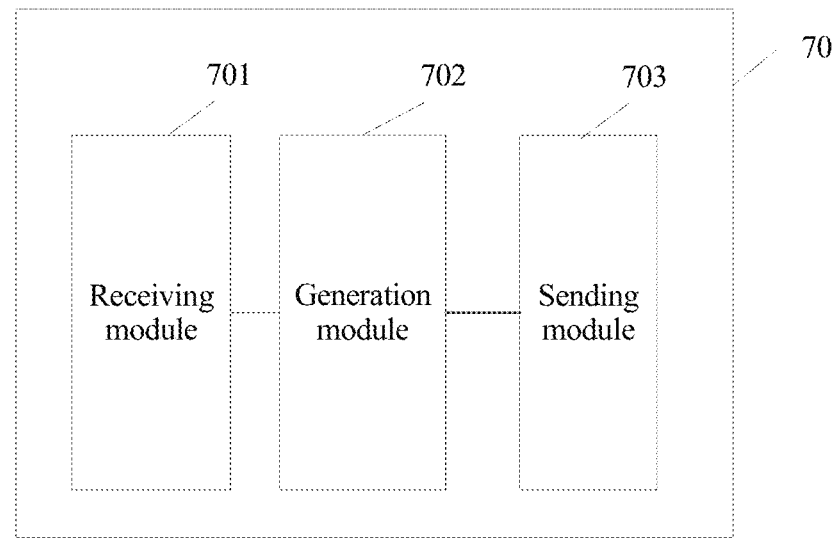
FIG. 7 is another schematic structural diagram of another network device according to an embodiment of this application.

As shown in FIG. 7, a second network device 70 may include a receiving module 701, a generation module 702, and a sending module 703.

The receiving module 701 is configured to receive an identifier of the terminal device, a first global public key, and a first public validation token. The first global public key is generated by the first network device, and the first public validation token is generated by the first network device.

The generation module 702 is configured to generate a second sub-private key based on a second parameter set. The second parameter set includes the identifier of the terminal device, the second global public key, and the second public validation token.

The sending module 703 is configured to send a second response message to the terminal device. The second response message includes at least the second sub-private key.

It should be noted that according to detailed descriptions of the embodiments in FIG. 2 and FIG. 3, a person skilled in the art may clearly know an implementation method of each function module included in the second network device 70. Therefore, for brevity of the specification, details are not described herein again.

In addition, an embodiment of the present disclosure further provides a private key generation system. The private key generation system includes a terminal device, a first network device, and a second network device.

In specific implementation, the terminal device may be a terminal device represented by the apparatus shown in FIG. 4, the first network device may be a first network device represented by the apparatus shown in FIG. 4, and the first network device may be a second network device represented by the apparatus shown in FIG. 4.

Alternatively, the terminal device may be a terminal device represented by the apparatus shown in FIG. 5, the first network device may be a first network device represented by the apparatus shown in FIG. 6, and the second network device may be a second network device shown in FIG. 7.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the several embodiments provided in this application, it should be understood that the disclosed system, device, and method may be implemented in other manners. For example, the described embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of this application without creative efforts.

In addition, the schematic diagrams illustrating the system, device, method and different embodiments may be combined or integrated with other systems, modules, technologies or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

What is claimed is:

1. A private key generation system, comprising:
    a first network device;
    a second network device; and
    a terminal device,
    wherein the first network device is configured to send a first response message to the terminal device, wherein the first response message comprises at least a first sub-private key, and the first sub-private key is generated based on a first parameter set sent by the second network device to the first network device;
    wherein the second network device is configured to send a second response message to the terminal device, wherein the second response message comprises at least a second sub-private key, and the second sub-private key is generated based on a second parameter set sent by the first network device to the second network device; and
    wherein the terminal device is configured to:
        synthesize a first joint private key based on at least the first sub-private key and the second sub-private key according to the following formula:

$$SSK\_1 = SSK1 + SSK2,$$

wherein SSK_1 is the first joint private key, SSK1 is the first sub-private key, and SSK2 is the second sub-private key,
        determine a first joint public validation token, and
        synthesize a first joint public key based on the first joint public validation token and an identifier of the terminal device, wherein the first joint public key is paired with the first joint private key.

2. The system according to claim 1, wherein:
    the terminal device is configured to send a first request to the first network device, wherein the first request comprises at least the identifier of the terminal device and an identifier of the second network device;
    the terminal device is configured to send a second request to the second network device, wherein the second request comprises at least the identifier of the terminal device and an identifier of the first network device;
    the first network device is configured to send a third request to the second network device based on the identifier of the second network device, wherein the third request comprises a first global public key and a first public validation token, the first global public key is generated by the first network device, and the first public validation token is generated by the first network device;
    the second network device is configured to send a fourth request to the first network device based on the identifier of the first network device, wherein the fourth request comprises a second global public key and a second public validation token, the second global public key is generated by the second network device, and the second public validation token is generated by the second network device;
    the first network device is configured to generate the first sub-private key based on the first parameter set, wherein the first parameter set comprises the identifier of the terminal device, the second global public key, and the second public validation token; and
    the second network device is configured to generate the second sub-private key based on the second parameter set, wherein the second parameter set comprises the identifier of the terminal device, the first global public key, and the first public validation token.

3. The system according to claim 1, wherein:
    the terminal device is configured to send a first request to the first network device, wherein the first request comprises at least the identifier of the terminal device and an identifier of the second network device;
    the first network device is configured to send a third request to the second network device based on the identifier of the second network device, wherein the third request comprises the identifier of the terminal device, a first global public key, a first public validation token, the first global public key is generated by the first network device, and the first public validation token is generated by the first network device;
    the second network device is configured to generate the second sub-private key based on the identifier of the terminal device, the first global public key, and the first public validation token;
    the second network device is configured to return a third response message to the first network device, wherein the third response message comprises a second global public key and a second public validation token, the second global public key is generated by the second network device, and the second public validation token is generated by the second network device; and
    the first network device is configured to generate the first sub-private key based on the identifier of the terminal device, the second global public key, and the second public validation token.

4. The system according to claim 1, wherein the first response message further comprises the first joint public validation token, and the terminal device is configured to obtain the first joint public validation token from the first response message.

5. The system according to claim 1, wherein the first response message further comprises the first public validation token, and the terminal device is configured to calculate the first joint public validation token according to the following formula:

$$PVT\_U1 = PVT1 * PVT2,$$

wherein PVT_U1 is the first joint public validation token, PVT1 is the first public validation token, and PVT2 is the second public validation token.

6. The system according to claim 2, wherein the terminal device is configured to synthesize the first sub-private key and the second sub-private key into a second joint private key according to the following formula:

$$SSK\_2 = SSK1 + SSK2 + HS * v0 \bmod q,$$

wherein SSK_2 is the second joint private key; SSK1 is the first sub-private key;
wherein SSK2 is the second sub-private key; HS is a hash parameter;
wherein HS=hash(KPAK1∥KPAK2∥ID∥PVT_U2), hash( ) is a hash function, KPAK1 is the first global public key, KPAK2 is the second global public key, ID is the identifier of the terminal device, and PVT_U2 is a second joint public validation token;
wherein q is a prime number; and
wherein v0 is a random number selected by the terminal device from a finite field F_q generated by the prime number q.

7. The system according to claim 6, wherein the terminal device is further configured to:
determine the second joint public validation token, and synthesize a second joint public key based on the second joint public validation token and the identifier of the terminal device, wherein the second joint public key is paired with the second joint private key.

8. The system according to claim 7, wherein the first response message further comprises the first joint public validation token, and the terminal device is configured to obtain the second joint public validation token from the first response message.

9. A private key generation method, comprising:
receiving, by a terminal device, a first response message sent by a first network device, wherein the first response message comprises at least a first sub-private key, and the first sub-private key is generated based on a first parameter set received from a second network device;
receiving, by the terminal device, a second response message sent by the second network device, wherein the second response message comprises at least a second sub-private key, and the second sub-private key is generated based on a second parameter set received from the first network device; and
synthesizing, by the terminal device, a first joint private key based on at least the first sub-private key and the second sub-private key according to the following formula:

$$SSK\_1 = SSK1 + SSK2,$$

wherein SSK_1 is the first joint private key, SSK1 is the first sub-private key, and SSK2 is the second sub-private key, determining, by the terminal device, a first joint public validation token, and
synthesize a first joint public key based on the first joint public validation token and an identifier of the terminal device,
wherein the first joint public key is paired with the first joint private key.

10. The method according to claim 9, wherein before the receiving, by the terminal device, the first response message received from the first network device, the method further comprises:
sending, by the terminal device, a first request to the first network device, wherein the first request comprises at least the identifier of the terminal device and an identifier of the second network device.

11. The method according to claim 9, wherein before the receiving, by the terminal device, the first response message received from the first network device, the method further comprises:
sending, by the terminal device, a first request to the first network device, wherein the first request comprises the identifier of the terminal device and an identifier of the second network device; and
sending, by the terminal device, a second request to the second network device, wherein the second request comprises the identifier of the terminal device and an identifier of the first network device.

12. A terminal device, comprising:
a receiver configured to:
receive a first response message from a first network device, wherein the first response message comprises at least a first sub-private key, and the first sub-private key is generated based on a first parameter set received from a second network device; and
receive a second response message from the second network device, wherein the second response message comprises at least a second sub-private key, and the second sub-private key is generated based on a second parameter set received from the first network device; and
a processor configured to:
synthesize a first joint private key based on at least the first sub-private key and the second sub-private key according to the following formula:

$$SSK\_1 = SSK1 + SSK2,$$

wherein SSK_1 is the first joint private key, SSK1 is the first sub-private key, and SSK2 is the second sub-private key,
determine a first joint public validation token, and
synthesize a first joint public key based on the first joint public validation token and an identifier of the terminal device,
wherein the first joint public key is paired with the first joint private key.

13. The device according to claim 12, further comprising:
a transmitter configured to send a first request to the first network device, wherein the first request comprises at least the identifier of the terminal device and an identifier of the second network device.

14. The device according to claim 12, further comprising:
a transmitter configured to:
send a first request to the first network device, wherein the first request comprises the identifier of the terminal device and an identifier of the second network device; and send a second request to the second network device, wherein the second request comprises the identifier of the terminal device and an identifier of the first network device.

\* \* \* \* \*